(12) United States Patent
Pietilä et al.

(10) Patent No.: US 7,421,011 B2
(45) Date of Patent: Sep. 2, 2008

(54) PERFORMING AN ACQUISITION IN A RECEIVER

(75) Inventors: Samuli Pietilä, Tampere (FI); Mikko Kokkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 619 days.

(21) Appl. No.: 10/855,806

(22) Filed: May 27, 2004

(65) Prior Publication Data

US 2005/0265431 A1 Dec. 1, 2005

(51) Int. Cl.
*H04B 1/69* (2006.01)
(52) U.S. Cl. .................................. 375/147; 375/130
(58) Field of Classification Search ................ 375/147, 375/130, 149, 316, 343; 370/515, 516
See application file for complete search history.

(56) References Cited

U.S. PATENT DOCUMENTS

2003/0215005 A1* 11/2003 Kontola et al. .............. 375/149

FOREIGN PATENT DOCUMENTS

| EP | 1 107 018 | 6/2001 |
|---|---|---|
| EP | 1379010 | 1/2004 |

OTHER PUBLICATIONS

"Improved Search Algorithm for Fast Acquisition in a DSP-based GPS Receiver;" Flavio Daffara et al; Signal, Systems and Electronics; IEEE 1998.

* cited by examiner

*Primary Examiner*—Khai Tran
(74) *Attorney, Agent, or Firm*—Alfred A. Fressola; Ware, Freesola, Van Der Sluys & Adolphson LLP

(57) ABSTRACT

A method for performing an acquisition to a code-modulated spread spectrum signal comprises receiving the transmitted signal, sampling the received signal to form samples, forming at least one reference code corresponding to a code used in the modulation and forming a non-coherent search matrix on the basis of said samples. The non-coherent search matrix comprises elements in at least a first and a second dimension. The first dimension of the non-coherent search matrix represents the same frequency deviation but different code phases of the received signal, and the second dimension of the non-coherent search matrix represents the same code phase but different frequency deviations of the received signal. Each element is addressable in the first dimension by a first index and in the second dimension by a second index.

34 Claims, 7 Drawing Sheets

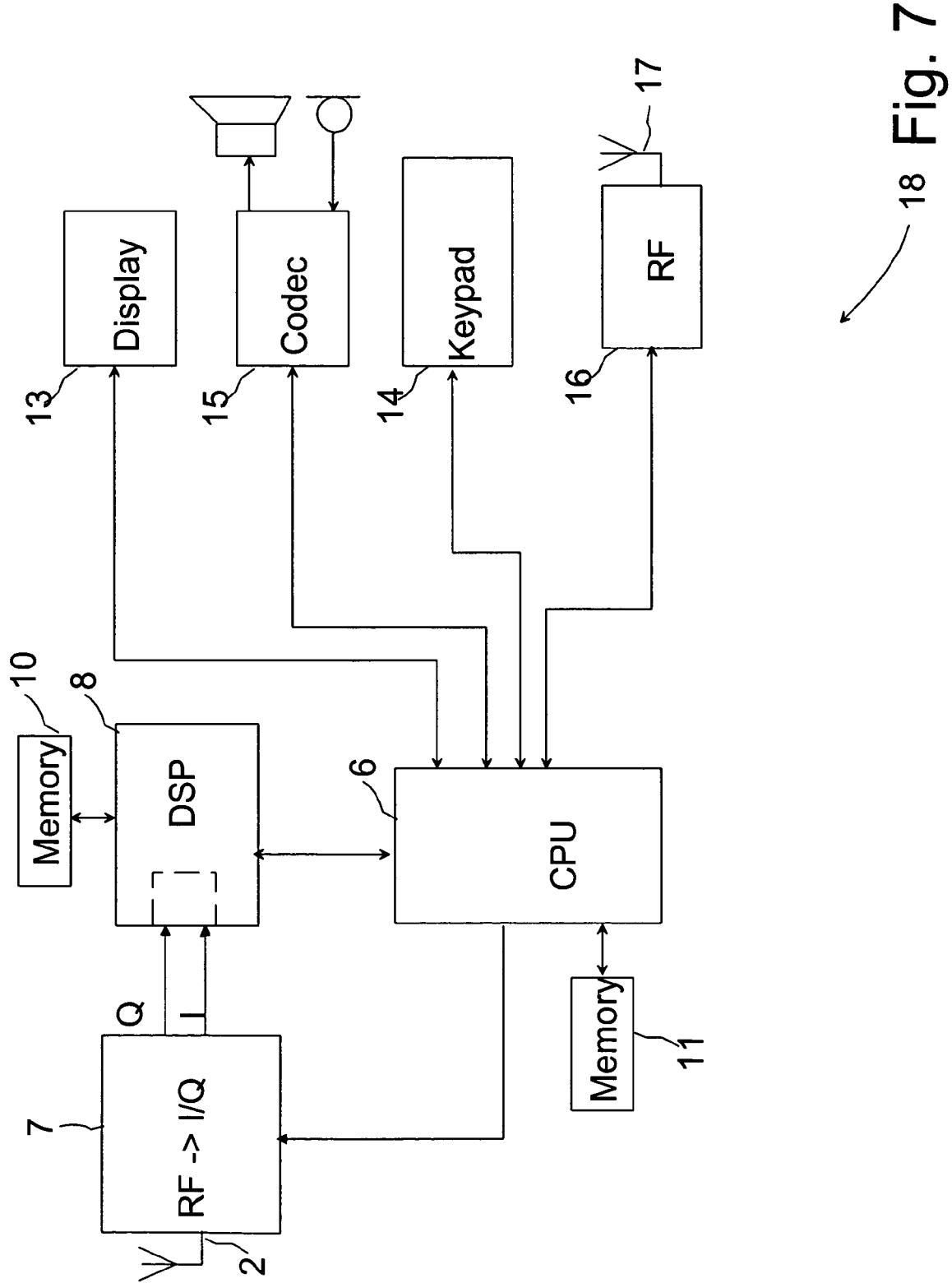

PERFORMING AN ACQUISITION IN A RECEIVER

FIELD OF THE INVENTION

The present invention relates to a method for performing an acquisition to a code-modulated spread spectrum signal. The invention also relates to a receiver, a module and a system. The invention further relates to a computer program product.

BACKGROUND OF THE INVENTION

The GPS system (Global Positioning System) is a well known global navigation satellite system (GNSS). It comprises over 20 satellites, of which a maximum of 12 satellites are normally visible to a receiver at the same time. These satellites transmit various information, such as Ephemeris data and clock data parameters which describe the satellite clock and its relationship to GPS time. Normally, the receiver used in positioning determines its location by calculating the transit time of signals transmitted simultaneously from several satellites of the positioning system to the receiver. To determine its location, the receiver must typically receive the signal of at least four visible satellites in order to be able to calculate the location.

Each operational satellite of the GPS system transmits a so-called L1 signal at a carrier frequency of 1575.42 MHz. This frequency is also denoted $154f_0$, where $f_0=10.23$ MHz. In addition, the satellites transmit an L2 signal at a carrier frequency of 1227.6 MHz, that is $120f_0$. In the satellite, these signals are modulated with at least one pseudo-random sequence. Each satellite has a different pseudo-random sequence. As a result of modulation, a code modulated wideband signal is formed. This modulation technique makes it possible for the receiver to distinguish between signals transmitted by different satellites, despite the fact that the carrier frequencies used in the transmission are essentially the same. This modulation technique is called Code Division Multiple Access (CDMA). One of the pseudo-random sequences used in each satellite for the modulation of the L1 signal is so-called C/A code (Coarse/Acquisition code), which is so-called Gold code. Each GPS satellite transmits a signal using a unique C/A code. The codes are formed as the modulo 2 sum of two 1023-bit binary sequences. The first binary sequence G1 is formed using the polynomial $X^{10}+X^3+1$, and the second binary sequence G2 is formed by delaying the polynomial $X^{10}+X^9+X^8+X^6+X^3+X^2+1$ so that each satellite has a different delay. This arrangement enables the generation of different C/A codes with a similar code generator. The C/A codes are binary codes, the chipping rate of which in the GPS system is 1.023 MHz. The C/A code comprises 1023 chips, which means that the repetition time of the code is 1 ms. The carrier wave of the L1 signal is further modulated with navigation information at a bit rate of 50 bit/s. The navigation information comprises information about the "health" of the satellite, its orbit and clock data parameters, etc. Each satellite of the GPS system maintains a local time by e.g. atomic clocks.

At the moment there are at least two other GNSS systems under development: Glonass (GLObal NAvigation Satellite System) and Galileo.

In order to detect the satellite signals and to identify the satellites, the receiver must perform an acquisition operation, in which the receiver searches for the signal of each satellite and tries to synchronize with the signal so that the data transmitted with the signal can be received and demodulated.

After acquisition with the code has been performed, the frequency is fine tuned and phase locking is carried out. The above mentioned acquisition and frequency adjustment process must be repeated for each satellite signal received at the receiver. Therefore, this process consumes a lot of time especially in a situation where the received signals are weak. In some prior art receivers, several correlators are used in order to accelerate this process, whereby more correlation peaks can be searched for simultaneously. In practical applications, it is not possible to accelerate the acquisition and frequency adjustment process very much by simply increasing the number of correlators, because their number cannot be increased indefinitely.

In a conventional DS-CDMA (Direct Sequence CDMA) receiver the acquisition procedure consists of the following phases: matched filtering or correlation, coherent averaging of the results from the matched filter and residual Doppler frequency analysis, non-coherent averaging and decision logic. After the non-coherent averaging there exists a two-dimensional array. An element in that array describes how well a local replica code with a certain chip phase offset and residual Doppler frequency offset correlates with the received signal. The decision logic searches for the maximum value and if this maximum value exceeds a predetermined threshold, then a decision that the signal is present is made. Quite often there exists an interfering signal, and this can complicate the acquisition procedure. In some cases it is impossible to know which signal is the right one. For example, when the signal level of the satellite being search for is very low, several sources of interference can make the acquisition of the weak signal difficult or even impossible. One example of these interference sources is a signal from another satellite, if the difference in the received power levels is large enough. Interference can be generated within the receiver also. With certain types of RF front ends it is difficult and costly to avoid injecting DC offset into the received signal. This DC offset is shifted by the local carrier wipe-off multiplier to a non-zero frequency. It is attenuated by the matched filter but when low level satellite signals are acquired this attenuation may not be enough so that the amplitude of sinusoid may be larger than the amplitude of the satellite signal after the matched filter.

In an European application EP 1 107 018 a method for synchronizing a receiver is disclosed. In the method a non-coherent search matrix is formed wherein in the acquisition procedure the maximum value of the non-coherent search matrix is located. If the maximum value exceeds a predetermined threshold, a detection decision is made and the code phase and Doppler frequency are calculated on the basis of the location of the maximum value in the search matrix.

SUMMARY OF THE INVENTION

According to the present invention, a receiver is disclosed in which acquisition can usually be performed even if the signals are weak. According to the current invention a further analysis is performed to signals of a prior art receiver. The invention is based on the idea that a statistical analysis is performed on values of lines (i.e. rows or columns) of the non-coherent search matrix. In the statistical analysis one or more statistical parameters are calculated on the basis of values of a row or a column of the non-coherent search matrix. A calculation is performed by using the statistical parameters and a value of the same row or column. The result of the calculation is then used to examine whether the value used in the calculation exceeds a certain threshold. The procedure can be repeated for each value of the same row or column and for other rows/columns. The statistical parameters are calculated for each row/column to be examined. In an example embodiment of the present invention the statistical parameters are mean value and standard deviation of the values of the same row/column. The invention is especially suited for use in positioning receivers, as well as in other receivers, advantageously in CDMA receivers, where the receiver must synchronize with a spread spectrum signal.

According to a first aspect of the invention there is provided a method for performing an acquisition to a code-modulated spread spectrum signal, the method comprising receiving the transmitted signal;

sampling the received signal to form samples;

forming at least one reference code corresponding to a code used in the modulation;

forming a non-coherent search matrix on the basis of said samples, said non-coherent search matrix comprising elements in at least a first dimension, the first dimension of said non-coherent search matrix representing the same frequency deviation but different code phases of the received signal, wherein each element is addressable in the first dimension by a first index; and determining a code phase of the code used in the modulation on the basis of values of elements of said non-coherent search matrix, said determining comprising:

defining at least one statistical parameter for at least one line of elements of said non-coherent search matrix in the first dimension on the basis of values of each element of said at least one line of elements;

defining a reference value on the basis of a value of an element of said line of elements and said at least one statistical parameter; and examining said reference value to determine whether said element of said line of elements corresponds to the code phase of the received signal, wherein the code phase of the received signal are determined on the basis of the first index of such element corresponding to the code phase of the received signal.

According to a second aspect of the invention there is provided a receiver comprising:

a receiving block for receiving a code-modulated spread spectrum signal;

a sampler for sampling the received signal to form samples;

means for forming at least one reference code corresponding to a code used in the modulation;

means for forming a non-coherent search matrix on the basis of said samples, said non-coherent search matrix comprising elements in at least a first dimension, the first dimension of said non-coherent search matrix representing the same frequency deviation but different code phases of the received signal, wherein each element is addressable in the first dimension by a first index; and determining means for determining a code phase of the code used in the modulation on the basis of values of elements of said non-coherent search matrix;

said determining means comprising:

means for defining at least one statistical parameter for at least one line of elements of said non-coherent search matrix in the first dimension on the basis of values of each element of said at least one line of elements;

means for defining a reference value on the basis of a value of an element of said line of elements and said at least one statistical parameter;

examining means for determining whether said element of said line of elements corresponds to the code phase of the received signal and providing an indication on such element corresponding to the code phase of the received signal; and decision means to determine, on the basis of the indication of the examining means, the code phase of the received signal on the basis of the first index of said element.

According to a third aspect of the invention there is provided a module comprising:

a sampler for sampling a received code-modulated spread spectrum signal to form samples;

means for forming at least one reference code corresponding to a code used in the modulation;

means for forming a non-coherent search matrix on the basis of said samples, said non-coherent search matrix comprising elements in at least a first dimension, the first dimension of said non-coherent search matrix representing the same frequency deviation but different code phases of the received signal, wherein each element is addressable in the first dimension by a first index; and determining means for determining a code phase of the code used in the modulation on the basis of values of elements of said non-coherent search matrix;

said determining means comprising:

means for defining at least one statistical parameter for at least one line of elements of said non-coherent search matrix in the first dimension on the basis of values of each element of said at least one line of elements; means for defining a reference value on the basis of a value of an element of said line of elements and said at least one statistical parameter;

examining means for determining whether said element of said line of elements corresponds to the code phase of the received signal and providing an indication on such element corresponding to the code phase of the received signal; and decision means to determine, on the basis of the indication of the examining means, the code phase of the received signal on the basis of the first index of said element.

According to a fourth aspect of the invention there is provided a system comprising a transmitter for transmitting a code-modulated spread spectrum signal; and a receiver for receiving the transmitted code-modulated spread spectrum signal, the receiver comprising:

a sampler for sampling the received signal to form samples;

means for forming at least one reference code corresponding to a code used in the modulation;

means for forming a non-coherent search matrix on the basis of said samples, said non-coherent search matrix comprising elements in at least a first dimension, the first dimension of said non-coherent search matrix representing the same frequency deviation but different code phases of the received signal; and determining means for determining a code phase of the code used in the modulation on the basis of values of elements of said non-coherent search matrix;

said determining means comprising:

means for defining at least one statistical parameter for at least one line of elements of said non-coherent search matrix in the first dimension on the basis of values of each element of said at least one line of elements;

means for defining a reference value on the basis of a value of an element of said line of elements and said at least one statistical parameter;

examining means for determining whether said element of said line of elements corresponds to the code phase of the received signal and providing an indication on such element corresponding to the code phase of the received signal; and decision means to determine, on the basis of the indication of the examining means, the code phase of the received signal on the basis of the first index of said element.

According to a fifth aspect of the invention there is provided a computer program product for performing an acquisition to a received code-modulated spread spectrum signal, the computer program product comprising machine executable steps for:

sampling the received signal to form samples;

forming at least one reference code corresponding to a code used in the modulation;

forming a non-coherent search matrix on the basis of said correlation function matrix, said non-coherent search matrix comprising elements in at least a first dimension, the first dimension of said non-coherent search matrix representing the same frequency deviation but different code phases of the received signal, wherein each element is addressable in the first dimension by a first index; and determining a code phase of the code used in the modulation on the basis of values of elements of said non-coherent search matrix, said determining comprising machine executable steps for:

defining at least one statistical parameter for at least one line of said non-coherent search matrix on the basis of values of each element of said line of said non-coherent search matrix;

defining a reference value on the basis of a value of an element of said line of said non-coherent search matrix and said at least one statistical parameter; and examining said reference value to determine whether said element of said line of elements corresponds to t the code phase of the received signal, wherein the code phase of the received signal are determined on the basis of the first index of such element corresponding to the code phase of the received signal.

The present invention provides advantages compared with prior art methods and receivers. The invention improves the receiver immunity towards internal and external interferers. The decision logic is simple, no decisions about the type or strength of the interfering signal are needed. The threshold setting can be independent of the integration time. The receiver according to the invention can be implemented using a relatively small number of components, and the total energy consumption can be maintained at a reasonable level, whereby the invention is especially suitable for use in portable devices. Thus the positioning receiver can also be implemented in connection with a mobile station.

DESCRIPTION OF THE DRAWINGS

In the following, the present invention will be described in more detail with reference to the accompanying drawings, in which FIG. 7 shows an electronic device according to an example embodiment of the invention as a simplified block diagram.

DETAILED DESCRIPTION OF THE INVENTION

Figure 1:
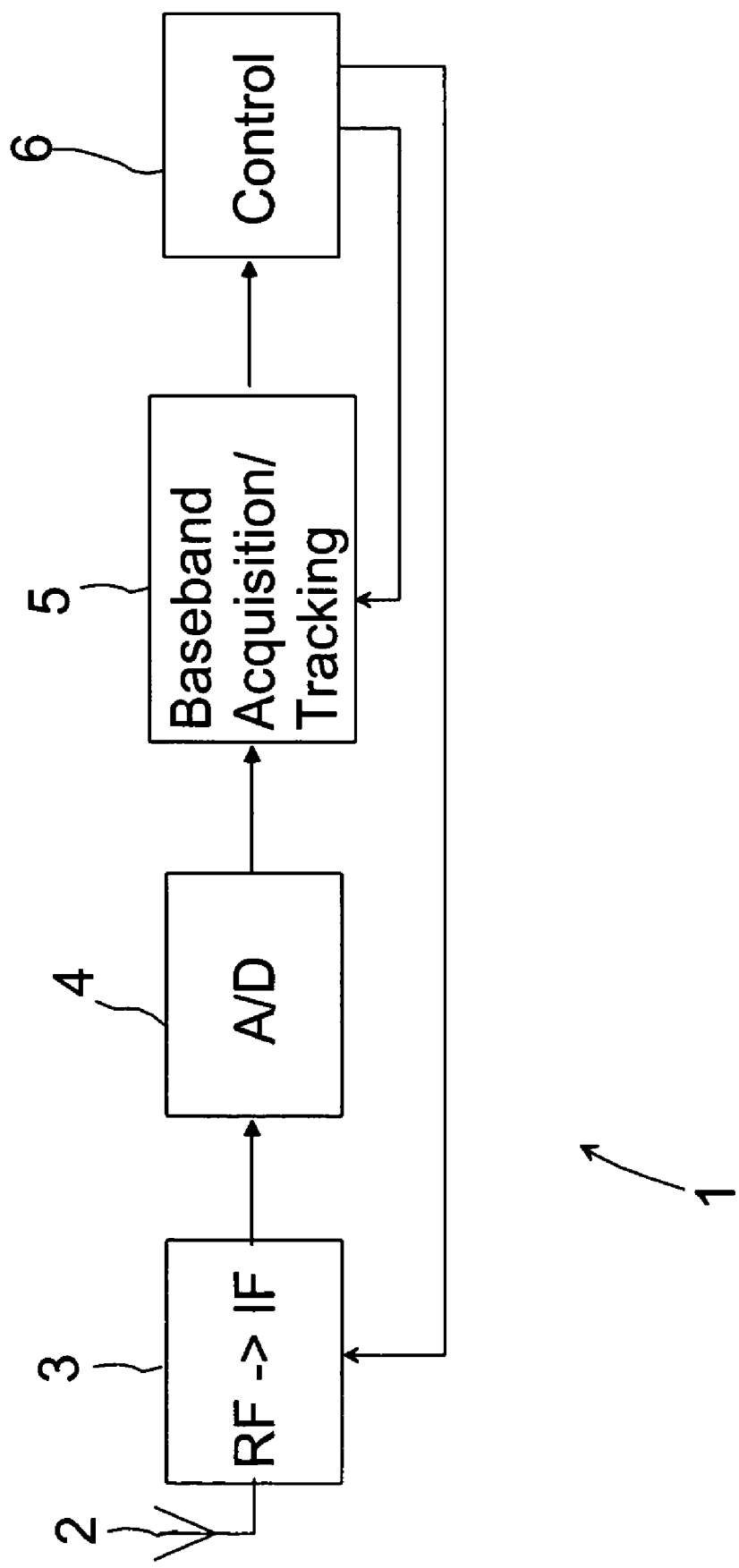
FIG. 1 is a simplified block diagram of a receiver, in which the method according to the invention can be applied.

In the following the invention will be described in more detail with reference to the figures. FIG. 1 which depicts a receiver 1 as a simplified block diagram. In the receiver 1 the signal received by the antenna 2 is, for example, converted to an intermediate frequency in the radio frequency block 3. As is well known, at this stage, the signal may comprise two components, I and Q, between which there is a phase difference of 90°. These intermediate frequency converted analogue signal components are digitized in digitizing block 4 and conducted to acquisition/tracking block 5. The acquisition/tracking block 5 tries to find the code phase and frequency deviation of the satellite to be used in operations performed after the acquisition. This will also be described later in this description. During acquisition, the control block 6 controls the acquisition/tracking block 5 and the radio frequency block 3 when necessary.

After switching on the operating voltage, or in a situation where the receiver 1 has been unable to receive the GPS satellite signals for a long time, a two-dimensional search step is carried out in the receiver 1 for each satellite signal received. The purpose of the two-dimensional search is to determine the carrier frequency and code phase of each satellite. The carrier frequency is affected by the Doppler shift resulting from the movement of the satellite and inaccuracies of the local oscillator of the receiver. The frequency inaccuracy can be rather large, as much as ±6 kHz, in which case the receiver must search a frequency range of approximately 12 kHz with respect to the actual transmission frequency (L1=1575.42 MHz). The receiver 1 does not know the exact code phase, either, whereby the receiver must also determine the code phase from 1023 possible code phases. This gives rise to a two-dimensional search process, in which frequency deviation in the range of 12 kHz and a code phase out of 1023 different code phases are searched. Obviously, the values used in this specification only serve as examples which clarify the invention, but do not constitute a limitation thereof. The invention can also be applied in systems other than GPS systems, in which case the frequency values, code phases and the number of codes can vary.

In the following, the operation of a method according to an example embodiment of the invention in a receiver 1 according to FIG. 1 will be described. It should be noted, however, that the following description is only a non-limiting example but the invention can also be applied in receivers which form the non-coherent search matrix in a different way.

In order to start acquisition, the receiver 1 sets the search frequency. The receiver can specify the frequency e.g. in such a way that it utilizes previously determined location information and/or almanac information, whereby the positioning can further be accelerated. Samples of the received signal are saved in the receiver 1, for example, as complex sample vectors $p_k(1), p_k(2) \ldots p_k(N)$, each of which comprises 1023 samples in this example embodiment. In this embodiment, the rate at which samples are stored is essentially the same as the chipping rate of the chips, which is approx. 1 023 000 samples a second. The sample vectors are continuous so that one sample vector continues temporally after another sample vector, that is the time difference between the last sample of the previous sample vector and the first sample of the next sample vector is essentially the same as the time difference between consecutive samples of the sample vector. Thus, the 1023 samples correspond to a signal of 1 ms. The sample vector formation step is denoted with the reference number 101 in the appended FIG. 2.

The number of sample vectors is N, where N is a power of two, for example. In addition, in this example embodiment of the invention the formation of sample vectors is repeated K times, as will be described later in this specification. In the following, the subscript k is used to denote different repetitions. When defining the number N of sample vectors $p_k(1)$, $p_k(2) \ldots p_k(N)$, it should be taken into consideration that in the GPS system the signal is modulated with information at a bit rate of 50 bits/s as binary phase modulation. Another factor, which limits the number N of sample vectors $p_k(1), p_k(2) \ldots p_k(N)$, is the frequency stability of the receiver's local oscillator.

In addition to the sample vector formation step, the acquisition method according to the invention also comprises a correlation step in which a correlation function matrix is formed.

Figure 2:
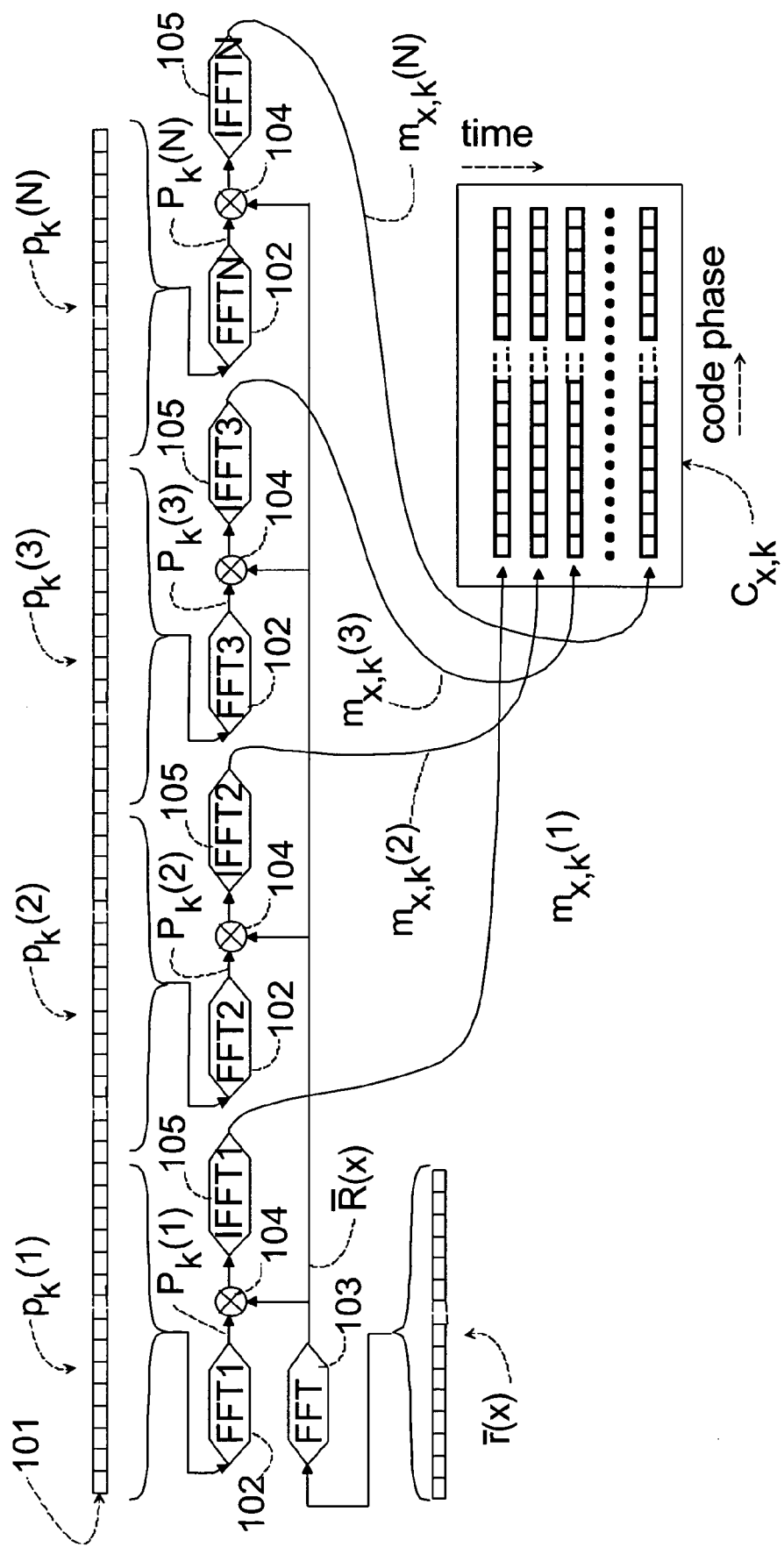
FIG. 2 shows the correlation step of a method according to an example embodiment of the invention as a simplified diagram.

The correlation step can be partly performed already during sampling, or after N sample vectors $p_k(1), p_k(2) \ldots p_k(N)$ have been formed. If the correlation step is performed for example in such a way that a time-to-frequency transformation, such as a Fast Fourier Transform (FFT), is calculated for each sample vector after it has been saved, the same time-to-frequency transformer can be used for all N sample vectors $p_k(1), p_k(2) \ldots p_k(N)$. If, on the other hand, the correlation step is performed after N sample vectors have been saved, a separate time-to-frequency transformer must be used for each sample vector, or the time-to-frequency transformations are performed for different sample vectors consecutively using the same time-to-frequency transformer. FIG. 2 shows the correlation step of the method, in which a correlation function matrix $C_{x,k}$ is formed from the sample vectors $p_k(1)$, $p_k(2) \ldots p_k(N)$. Although the Fourier transform is mainly used as an example of a time-to-frequency transformation throughout this description, and the inverse Fourier transform is used as an example of an inverse transformation, that is a frequency-to-time transformation, it is obvious that this invention is not limited to these examples only.

A discrete Fourier transformation 102, for example a fast Fourier transform, FFT, is performed on each sample vector $p_k(1), p_k(2) \ldots p_k(N)$.

$$P_k(i) = FFT(p_k(i)), \text{ where } i=1, \ldots, N \quad (1)$$

This is illustrated by blocks FFT1, FFT2, ..., FFTN in FIG. 2. In practice, the number of values used in calculations may be 1024, because then the discrete Fourier transformation can be implemented in practical applications much more efficiently (with an FFT algorithm) than when 1023 values are used. One way of doing this is to add an extra zero as the 1024th element. This has a minor effect on the transformation result.

The reference codes r(x) corresponding to the C/A codes of all the satellites of the GPS system may be stored in the receiver, where x refers to the satellite identifier and is, for example, in the range 1-36. It is not necessary to store the reference codes, but they can also be generated in the receiver. In the correlation stage, the reference code of the satellite transmitting the signal with which the receiver is being synchronized at a particular time is selected or generated. The reference code is temporally reversed. A discrete Fourier transformation 103, for example a fast Fourier transform (FFT) is performed on the reversed reference code, which is denoted by $\bar{r}(x)$ in FIG. 2.

$$\bar{R}(x) = FFT(\bar{r}(x)) \quad (2)$$

The reversed reference code $\bar{r}(x)$ and/or its FFT transform may have been saved in the memory of the receiver in advance, or it is formed from the reference code r(x) in connection with the acquisition process.

In the next step of the correlation stage a multiplication 104 is performed between the Fourier transformation result $P_k(i)$ for each sample vector $p_k(i)$ and the Fourier transformation $\bar{R}(x)$ of the reversed reference code $\bar{r}(x)$.

$$M_{x,k}(i) = \bar{R}(x) \cdot P_k(i) \quad (3)$$

An inverse Fourier transformation 105 is performed on the results of these multiplications, whereby the result is a cross-correlation of the reference code r(x) and the received signal with all possible integer delays (1023).

$$m_{x,k}(i) = iFFT(M_{x,k}(i)) \quad (4)$$

This result is based on the fact that the Fourier transformation of the convolution of time domain signals corresponds to the multiplication of Fourier-transformed signals, that is time domain signals transformed into the frequency domain. When a reversed reference code is also used, a fast discrete time correlation can be performed using a Fourier transform. Thus, in this example, the cross-correlation result comprises 1023 elements. The cross-correlation results $m_{x,k}(i)$ formed from the various sample vectors $p_k(i)$ are used to form a correlation function matrix $C_{x,k}$, in which the number of rows is the number N of sample vectors.

It is obvious that instead of temporal reversal of the reference code, it is possible to form reversed sample vectors $\bar{p}_k(i)$ from the sample vectors $p_k(i)$, in which case the reference code r(x) is used directly and the reversed sample vectors are used in the calculations presented above. In an example embodiment, it is not necessary to perform either of the reversals mentioned above, but the reference code r(x) and the sample vectors $p_k(i)$ can be used as such. This is based on using a property of the correlation theorem, which shows that the cross-correlation $corr(z_1, z_2)$ between two time discrete functions $z_1, z_2$ can be formed by means of a frequency-to-time transformation of frequency domain transformed functions. This can be represented with the following expression:

$$corr(z_1, z_2) \propto IFFT(Z_1^* \cdot Z_2) \quad (5)$$

Thus, in an example embodiment of the invention, it is possible to form the cross-correlation between the sample vectors $p_k(i)$ and the reference code r(x) by performing a Fourier transform (such as a fast Fourier transform FFT) on the sample vectors $p_k(i)$ and the reference code r(x) to form a Fourier transform $P_k(i)$ of the sample vector $p_k(i)$ and a Fourier transform R(x) of the reference code r(x), forming the complex conjugate $P^*_k(i)$, of the Fourier transform $P_k(i)$ of the sample vector, multiplying the formed complex conjugate $P^*_k(i)$ with the Fourier transform R(x) of the reference code and performing an inverse Fourier transform on the multiplication result. Alternatively, a complex conjugate $R^*(x)$ can be formed from the Fourier transform R(x) of the reference code, in which case it is multiplied with the Fourier transformation $P_k(i)$ of the sample vector, whereafter an inverse Fourier transformation is performed on the multiplication result.

In this connection, it should be emphasized that the method for calculating the cross-correlation between the sample vectors and the reference code r(x) presented in the previous paragraph is a consequence of the basic properties of correlation and convolution and the close dependence between them, whereby reversal of a function in the time domain is practically equivalent to the formation of a complex conjugate in the frequency domain. This is dealt with in more detail e.g. in the publication: "Digital Signal Processing—A Practical Approach", Emmanuel C. Ifeachor and Barrie W. Jervis, Addison-Wesley Publishing Company 1993, ISBN 0-201-54413-X, paragraph 4: "Correlation and Convolution", which is referred to in this connection. It should also be mentioned that in general, it is not important for the application of this invention which method is used to obtain the cross-correlation result.

The rows of the correlation function matrix $C_{x,k}$ formed in the correlation stage represent the cross-correlation of the received signal and the reference code with different phase differences at intervals of one millisecond. As a formula, the correlation function matrix can be expressed as follows:

$$\overline{C}_{x,k} = \begin{bmatrix} m_{x,k}(1) \\ m_{x,k}(2) \\ \vdots \\ m_{x,k}(N) \end{bmatrix} \quad (6)$$

Figure 3:
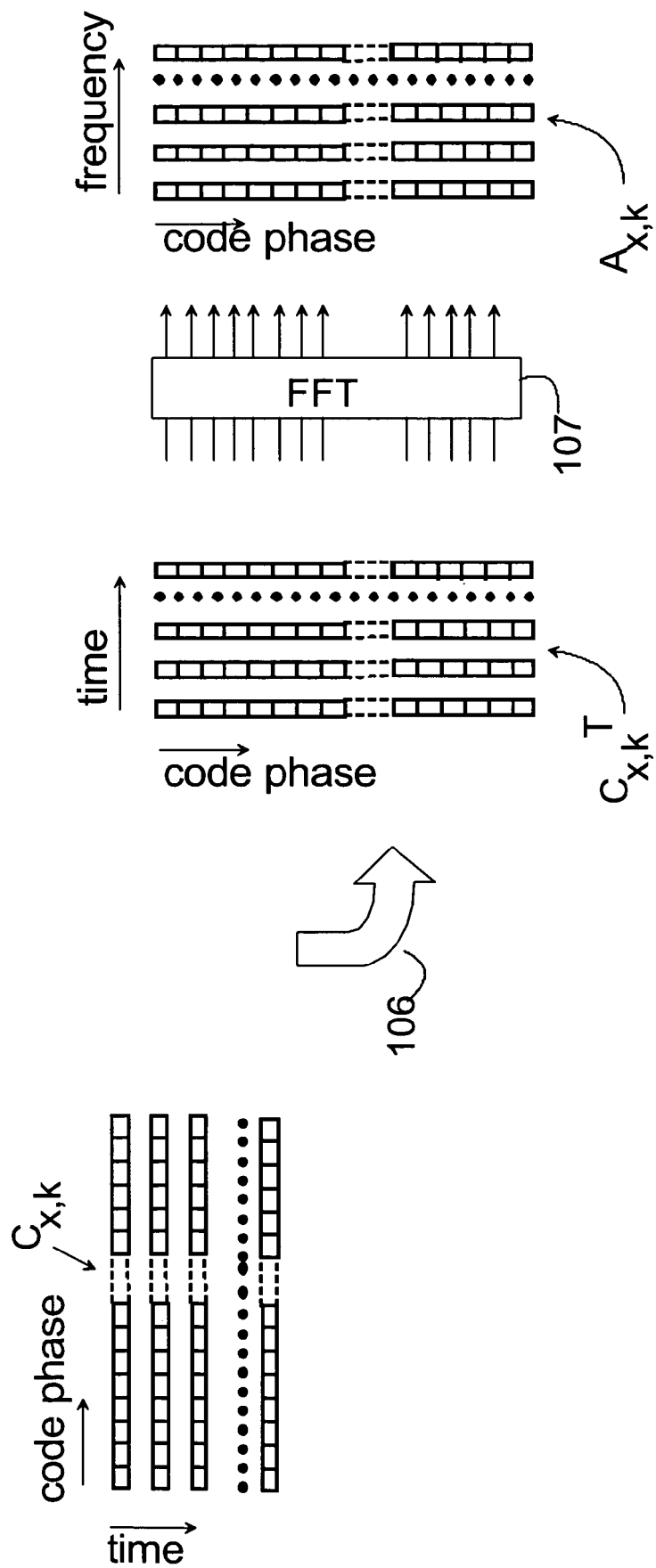
FIG. 3 shows the analysis step of a method according to an example embodiment of the invention as a simplified diagram.

In the next phase, that is the analysis phase, the transpose 106 of the correlation function matrix $C_{x,k}$ is used, in which the rows represent the signal samples in the time domain. Each row corresponds to a certain code phase difference between the received signal and the reference code. A Fourier transform 107 is performed on each row of the transpose of the correlation function matrix $C_{x,k}$ to form a coherent search matrix $A_{x,k}$, whereby a frequency analysis can be performed to determine the actual frequency shift. This is illustrated by FIG. 3.

$$A_{x,k} = FFT(C_{x,k}^T) \quad (7)$$

In practical applications, it is not necessary to form a transposed matrix from the correlation function matrix in a separate step, but the elements of the stored correlation function matrix $C_{x,k}$ are read from memory 10 (FIG. 7) in a different direction, for example, by columns.

The correlation function matrix $C_{x,k}$ can also be formed e.g. by using matched filters, in a manner known as such.

However, as mentioned above, in the GPS system the signal is modulated with a signal of 50 bit/s, which in practical applications limits the value of the number N. In this case the number N is selected so that the modulation does not have a substantial effect on the analysis. Furthermore, the optimum value of N is dependent on the window function used in the Fourier transformation. For example, if N is chosen to be equal to 32, the noise band width is in the order of 30 Hz, which may still be a little too large for detecting signals with a strength of the order of −150 dBm at the receiver. For this reason, a non-coherent summing step, in which the signal-to-noise ratio is improved, is performed in the acquisition/tracking block 5.

Figure 4:
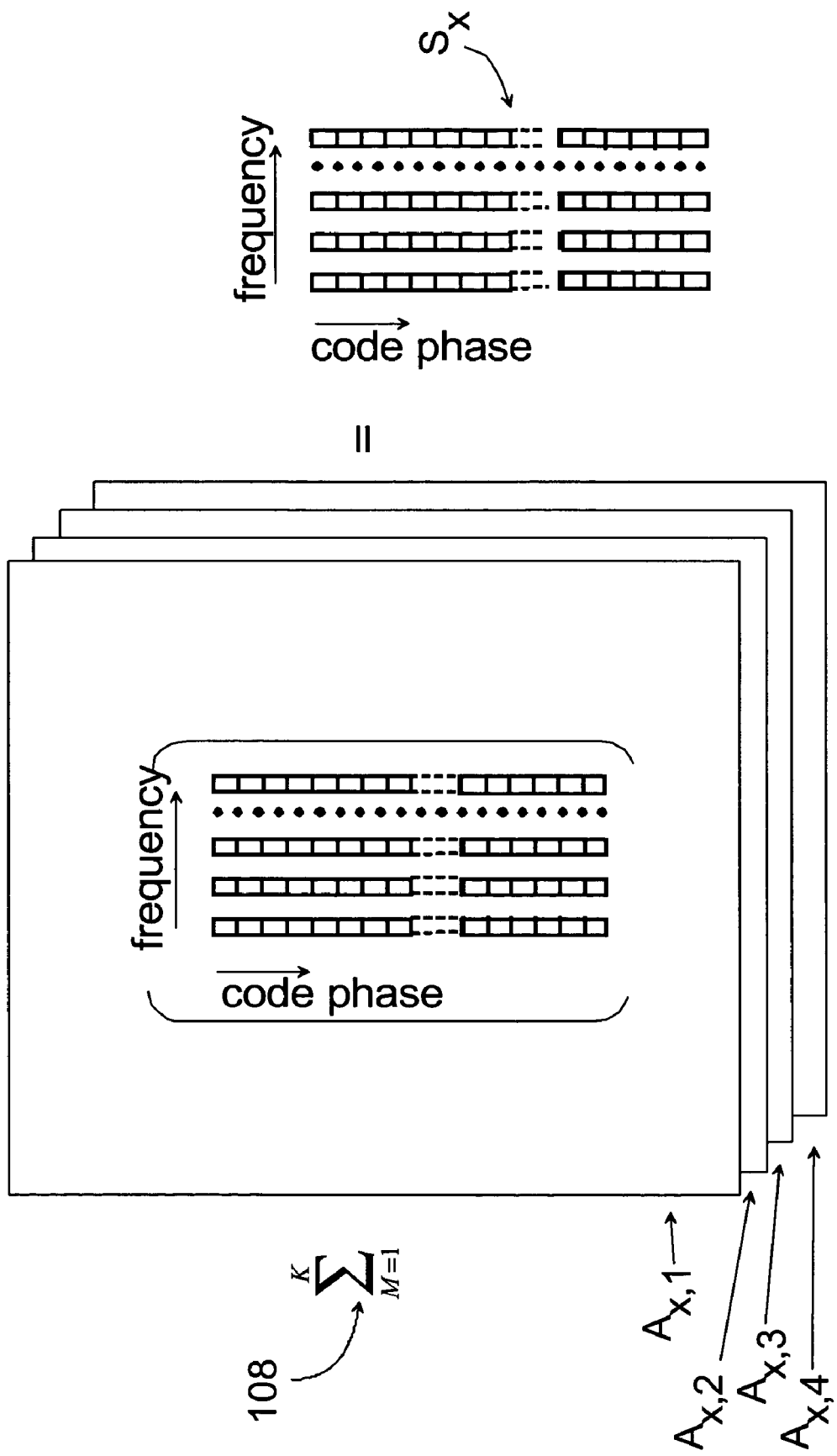
FIG. 4 shows the summing step of a method according to an example embodiment of the invention as a simplified diagram.

In order to implement the non-coherent summing step, the sample vector formation step, the correlation step and the analysis step described above are repeated K times (this is illustrated with the reference 108 in FIG. 4). The number of repetitions K is selected such that the signal-to-noise ratio can be improved sufficiently, in a reasonable time. A coherent search matrix $A_{x,k}$ is formed each time the analysis step is performed, and a non-coherent summing operation is performed on it to form a non-coherent search matrix $S_x$. In this example embodiment the non-coherent search matrix $S_x$ is formed as follows. For example, a magnitude value or some other absolute value, such as the square of the magnitude value, is calculated for each of the complex elements $a_{x,k}(i,j)$ of each coherent search matrix $A_{x,k}$. The numerical values calculated from corresponding elements of each non-coherent search matrix are summed, that is, an addition of the matrices is performed, which can be expressed with the formula:

$$S_x = \sum_{k=1}^{K} \begin{bmatrix} |a_{x,k}(1,1)| & \cdots & |a_{x,k}(1,N)| \\ \vdots & \ddots & \vdots \\ |a_{x,k}(1023,1)| & \cdots & |a_{x,k}(1023,N)| \end{bmatrix} \quad (8)$$

In practical applications, a non-coherent search matrix can be formed in at least two ways. In the first alternative implementation, the coherent search matrix formed at each iteration is stored. After the required number of repetition, a non-coherent search matrix is formed by summing the equivalent elements according to Formula 8. In this alternative implementation, memory is required for storing the elements of all the coherent search matrices. According to another alternative implementation, one coherent search matrix is calculated initially, and the values of this matrix are copied as the elements of the non-coherent search matrix. At each iteration a coherent search matrix is formed, and the numerical values (e.g. absolute values) calculated from corresponding elements of that matrix are summed with the corresponding elements of the non-coherent search matrix. In this alternative, summing of the equivalent elements is thus performed at each time of iteration. Only one coherent search matrix is thus stored, whereby less memory is needed than in the first alternative.

Figures 5, 6A:
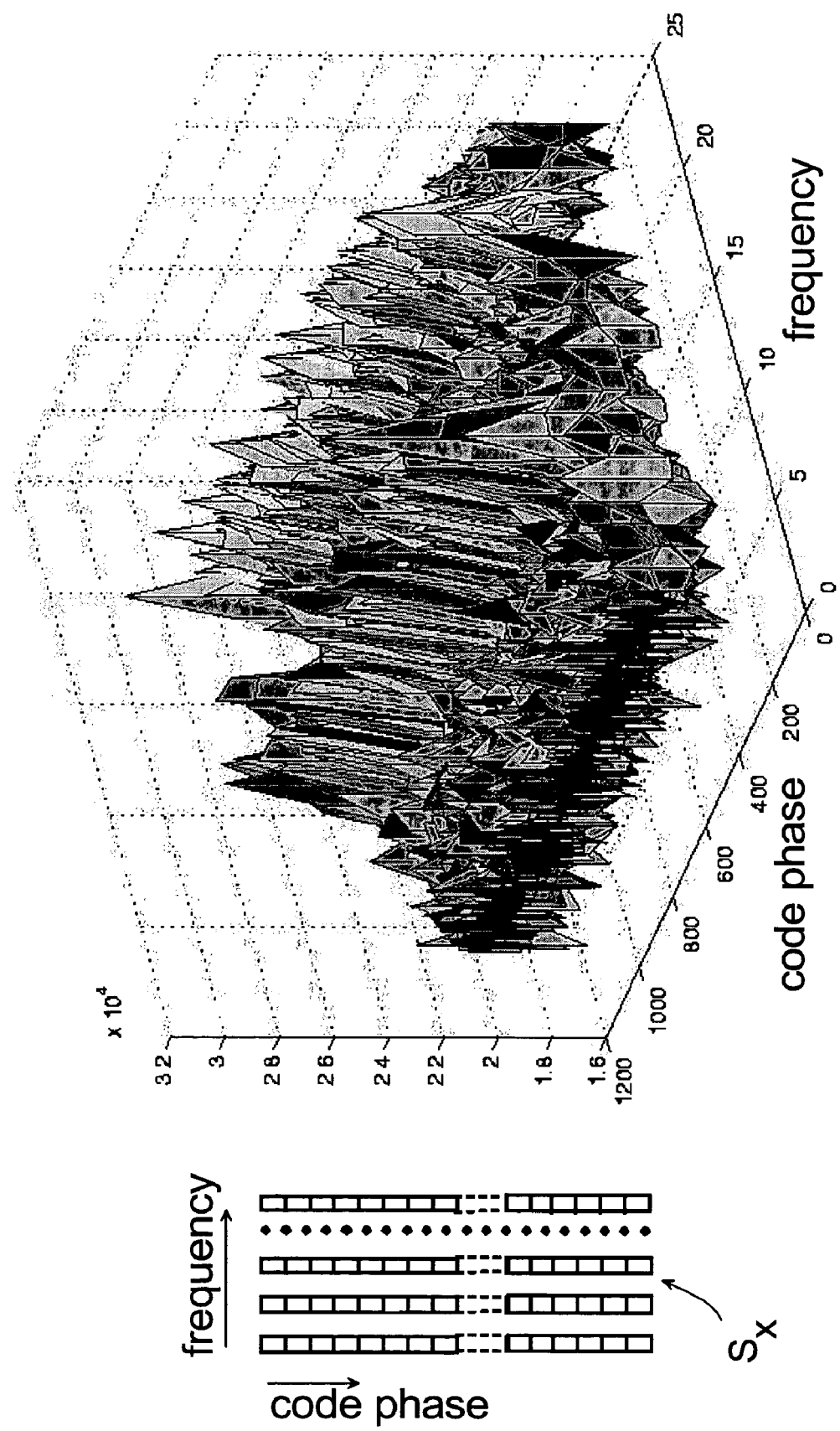
FIG. 5 shows the decision step of a method according to an example embodiment of the invention as a simplified diagram.
FIG. 6a shows the contents of the non-coherent search matrix of a conventional receiver as a 3D surface plot.

FIG. 6a depicts an example in which the contents of the search matrix $S_x$ is shown before the determination step according to the present invention. Two interfering signals can be clearly seen.

After the required number of iterations have been performed, the values of the elements $s_x(i,j)$ of the non-coherent search matrix $S_x$ are used in the determination step, in an attempt to find a value which exceeds the predefined threshold value. To perform the determination some statistical parameters are defined on the basis of the non-coherent search matrix $S_x$. The statistical parameters are calculated for each frequency deviation value i.e. for each column of the non-coherent search matrix $S_x$ of the above described example. However, the values of the non-coherent search matrix $S_x$ can also be arranged such that the columns represent different code phases and the rows represent different frequency deviation values (i.e. each value of the same row has the same frequency deviation value but a different code phase than the other values of the same row). In that kind of embodiments the statistical parameters are formed for each row of the search matrix $S_x$.

In an example embodiment of the present invention a first and a second parameter are calculated for each column of the non-coherent search matrix $S_x$. The first parameter $p_1$ is the mean value of all the values of the same column of the non-coherent search matrix $S_x$ and the second parameter $p_2$ is the standard deviation of the values of the same column of the non-coherent search matrix $S_x$. Then, for each value of the column a reference value is calculated by, for example, the following equation:

$$T=(X_{ij}-p_1(X_{ij}))/p_2(X_{ij}) \quad (9)$$

in which $p_1(X_{ij})$ is the first parameter (e.g. mean($X_{ij}$)),
$p_2(X_{ij})$ is the second parameter (e.g. std($X_{ij}$)),
$X_{ij}$ is the value to be examined, and
T is the calculated reference value for the value under examination,
i denotes the spreading code axis (code phase), and
j denotes the frequency axis (frequency deviation).

After calculating the reference value T for the value under examination it is compared with a threshold value C. If the reference value T is greater than the threshold value C it is determined that the value under examination represents a correct code phase and frequency deviation of the signal to be received. Therefore, the row and column indices of the value under examination indicate the code phase and the frequency deviation for the signal. The determined code phase and frequency deviation can then be used in the tracking phase of the signal.

If, however, the reference value T is not greater than the threshold value C it is determined that the value under examination is not the correct one and the next value of the same column will next be used as the value under examination. Then, the reference value T will be calculated (if not already done) for this current value and compared with the threshold C. The procedure described above will be repeated until all the values of the same column are examined or until a reference value T exceeds the threshold value C. If none of the reference values calculated for the values of the current column is greater than the threshold value C, another column (for example the next column) will be selected and reference values T are calculated for the values of the selected row and compared with the threshold value C.

There are some alternative ways to perform the above described examination procedure of the present invention. For example, the reference values T may be calculated for all values of the search matrix before they are compared with the threshold value C, or the calculation of one reference value T is followed by the comparison of the reference value T with the threshold value C. Yet another alternative is that the reference values T of one column are calculated at a time and then the comparison is performed for all the reference values T of the column in question.

If the comparison of a reference value T with the threshold value C indicates that the reference value T exceeds the threshold value C the examination procedure is not necessarily stopped immediately but it may be continued until all the values of the search matrix are examined. In that case there may be more than one value which exceeds the threshold value C. In that case the greatest reference value can be selected for the indication of the correct code phase and frequency deviation or the correct code phase and frequency deviation is determined by a combination (e.g. a mean value) of the values which are greater than the threshold value C.

As long as the number of samples that are non-coherently summed is large enough (roughly 10 or larger) so that the law of large numbers can be considered applicable and assuming that sample mean and sample standard deviation are good approximations for the true mean and the true standard deviation, then the reference value T is approximately normally distributed with zero mean and standard deviation unity. This means that the threshold value C can be chosen independently of the noise level in the receiver front-end (the radio frequency block 3) and the integration time. Hence the receiver will automatically adapt its performance according to the existing interference environment, and only one threshold C is sufficient regardless of the integration time.

In practise a computationally more efficient way to implement the basic principle is to search for the maximum value in each column (frequency bin) and then compute the reference value T only for the maximum of each column. This implementation method reduces the number of divisions by the length of the spreading code (e.g. 1023 for the GPS C/A code).

In the above described example embodiment a division operation was used in the calculation of the reference value T. This can be avoided, for example, by performing the examination in the following way. First, the maximum value in each frequency bin is searched for and these maxima are then ordered into e.g. descending order. For each element in the ordered list of maxima it is checked if the inequality $X_{ij}>C \cdot p_2(X_{ij})+p_1(X_{ij})$ is satisfied or not. The coordinates (row and column indices) of the largest (first) element that satisfies the inequality determine the parameters of the detected satellite signal. If the threshold value C is chosen so that the probability of a false alarm is reasonably small, then this modified logic will yield similar results as the logic presented previously in the description.

Figure 6B:
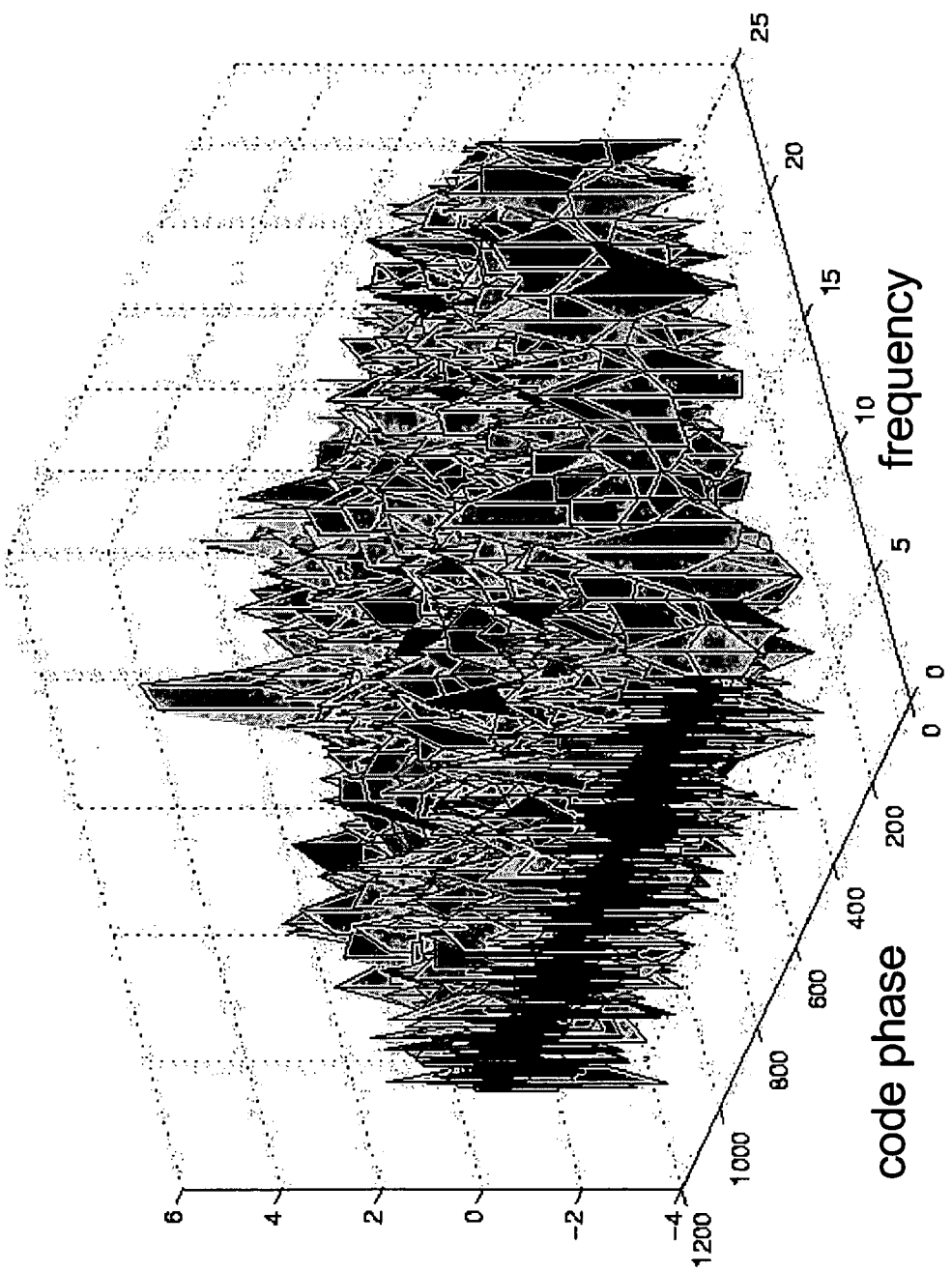
FIG. 6b presents the contents of the non-coherent search matrix after each frequency bin has been processed by a method according to the present invention.

The example of FIG. 6*b* illustrates a situation in which two values, which are clearly larger than the other values, have been found. The larger one (or a combination of the values) can then be used in determining of the correct code phase and frequency deviation. If, on the other hand, no such value is found in the non-coherent search matrix $S_x$, a signal transmitted by the searched satellite was probably not received in the frequency range examined or was too weak to be detected.

Once the correct frequency deviation and code phase have been determined, the receiver can be set into tracking mode if the receiver is also adapted to perform the tracking operation. Reception of data is unlikely to be successful for very weak signals and in this case, in a manner known as such, it may be necessary to rely on data received via a mobile telephone network (not shown), for example. In this case distance measurement is still possible, but with reduced accuracy.

For calculating the location, the receiver performs the signal reception for example on the basis of signals received from at least four satellites. In this case the previously described acquisition process is repeated as required on the basis of each satellite signal, whereupon the code of the satellite with which acquisition is performed is selected as the reference sequence r(x).

The invention can also be implemented so that there is only one frequency bin in the coherent and non-coherent search matrices (only the code phase is searched for). This means that there is only one column (if columns represent the frequency) or one row (if rows represent the frequency) in the search matrices.

Most of the blocks required for the implementation of the method can be implemented for example in a digital signal processing unit 8 (FIG. 7). Either hardware-based solutions or software implementations of the digital signal processor can be used to perform FFT transformations. In addition, a control element, e.g. a microprocessor or the like can be used to control the operation of the receiver.

An electronic device 18 according to an example embodiment of the invention, comprising a mobile station and a positioning receiver, is shown in FIG. 7. A first antenna 2 is used for the reception of the signal transmitted by the positioning satellites. The received signal is applied to a first radio part 7, in which the signal is down-converted and digitized. The first radio part comprises, among other things, the radio frequency block 3 and the digitizing block 4 of the receiver shown in FIG. 1. The digitized signal, which at this stage may comprise I and Q components, is applied to the digital signal processing unit 8, in which, among other things, sample vectors are formed. The samples are saved in the first memory means 10, which comprises, for example, a read/write memory and also read only memory and/or non-volatile read/write memory for storing the program code of the digital signal processing unit 8. In this embodiment, among other things, the functions of the acquisition/tracking block 5, such as the formation of the correlation function matrix $C_{xk}$ using, for example, Fourier transformers FFT1, FFT2, ..., FFTN and/or matched filters are implemented in signal processing unit 8. Formation of the coherent search matrix $A_{xk}$ and non-coherent summing step can also be performed in the digital signal processing unit 8. The digital signal processing unit 8 transmits information about the calculated phase difference and the frequency deviation to the control block 6, which comprises, for example, a microprocessor and I/O logic. The second memory means 11 is used as the data and program memory of the control block 6. It is obvious that the first memory means 10 and the second memory means 11 can also comprise common memory. Positioning information can be shown to the user on the display 13.

Operations of the mobile station can also be implemented in the application software of the control block 6. Thus, the display 13 can be used to present telephone call information in a manner known as such. The user can control the positioning receiver and the mobile station using the keyboard 14. The coding and decoding of audio signals is performed by means of a codec 15. The radio part 16 and the second antenna 17 of the mobile station are also shown in FIG. 7.

The present invention is not limited to the previously described embodiments only, but can be modified without departing from the scope defined by the attached claims.

What is claimed is:

1. A method for performing an acquisition to a code-modulated spread spectrum signal, the method comprising:
   receiving the code-modulated spread spectrum signal;
   sampling the received code-modulated spread spectrum signal to form samples;
   forming at least one reference code corresponding to a code used in the modulation;
   forming a non-coherent search matrix on the basis of said samples, said non-coherent search matrix comprising elements in at least a first dimension, the first dimension of said non-coherent search matrix representing the same frequency deviation but different code phases of the received signal, wherein each element is addressable in the first dimension by a first index; and
   determining a code phase of the code used in the modulation on the basis of values of elements of said non-coherent search matrix; said determining comprising:
      defining at least one statistical parameter for at least one line of elements of said non-coherent search matrix in the first dimension on the basis of values of each element of said at least one line of elements;
      defining a reference value on the basis of a value of an element of said line of elements and said at least one statistical parameter; and
      examining said reference value to determine whether said element of said line of elements corresponds to the code phase of the received signal, wherein the code phase of the received signal is determined on the basis of the first index of such element corresponding to the frequency deviation and the code phase of the received signal.

2. The method according to claim 1, wherein said non-coherent search matrix also comprises elements in a second dimension representing the same code phase but different frequency deviations of the received code-modulated spread spectrum signal, each element being addressable in the second dimension by a second index, said determining further comprising determining a frequency shift of the transmitted code-modulated spread spectrum signal and examining said reference value to determine whether said element of said line of elements corresponds to the frequency deviation, wherein the frequency deviation of the received code-modulated spread spectrum signal is determined on the basis of the second index of such element corresponding to the frequency deviation of the received code-modulated spread spectrum signal.

3. The method according to claim 2, wherein said examining comprises comparing the reference value with a threshold value, wherein if the reference value exceeds said threshold value, determining that said element of said line of elements corresponds to the frequency deviation and the code phase of the received signal.

4. The method according to claim 2 comprising defining a first statistical parameter as a mean value of the values of elements of the line, and defining a second statistical parameter as a standard deviation of the values of elements of the line.

5. The method according to claim 4 comprising calculating the reference value by using the equation:

$$T=(X_{ij}-p_1(X_{ij}))/p_2(X_{ij})$$

in which
   $p_1(X_{ij})$ is the first statistical parameter,
   $p_2(X_{ij})$ is the second statistical parameter,
   $X_{ij}$ is the value to be examined, and
   T is the calculated reference value for the value under examination,
   i denotes the code phase, and
   j denotes the frequency deviation.

6. The method according to claim 2, wherein said forming a non-coherent search matrix comprises:
   performing a correlation between the samples and said at least one reference code to form a set of correlation results;
   arranging said set of correlation results as elements of a correlation function matrix; and
   forming said non-coherent search matrix from the correlation function matrix.

7. The method according to claim 2, comprising repeating the determining a frequency shift of the transmitted code-modulated spread spectrum signal and a code phase of the code used in the modulation for each element of each line of elements of the non-coherent search matrix in the first dimension.

8. The method according to claim 7, wherein said examining comprises comparing all the reference values with a threshold value, wherein if any of the reference values exceeds said threshold value, determining the frequency deviation and the code phase of the received signal on the basis of the indices of the elements which correspond to the reference values exceeding said threshold value.

9. A receiver comprising:
   a receiving block for receiving a code-modulated spread spectrum signal;

a sampler for sampling the received signal to form samples;

reference code generator for forming at least one reference code corresponding to a code used in the modulation;

search matrix module for forming a non-coherent search matrix on the basis of said samples, said non-coherent search matrix comprising elements in at least a first dimension, the first dimension of said non-coherent search matrix representing the same frequency deviation but different code phases of the received signal, wherein each element is addressable in the first dimension by a first index; and a determining module configured for determining a code phase of the code used in the modulation on the basis of values of elements of said non-coherent search matrix;

said determining module configured:

for defining at least one statistical parameter for at least one line of elements of said non-coherent search matrix in the first dimension on the basis of values of each element of said at least one line of elements;

for defining a reference value on the basis of a value of an element of said line of elements and said at least one statistical parameter;

for determining whether said element of said line of elements corresponds to the code phase of the received signal and providing an indication on such element corresponding to the code phase of the received signal; and for determining on the basis of said indication, the code phase of the received signal on the basis of the first index of said element.

10. The receiver according to claim 9, wherein said non-coherent search matrix also comprising elements in a second dimension representing the same code phase but different frequency deviations of the received signal, each element being addressable in the second dimension by a second index, said determining module also being adapted to determine a frequency shift of the transmitted signal, and also being adapted to examine said reference value to determine whether said element of said line of elements corresponds to the frequency deviation, wherein the frequency deviation of the received signal is arranged to be determined on the basis of the second index of such element corresponding to the frequency deviation of the received signal.

11. The receiver according to claim 10, wherein said determining module comprises a comparator for comparing the reference value with a threshold value, wherein if the reference value exceeds said threshold value, said indication is provided for the element corresponding to the reference value.

12. The receiver according to claim 10, wherein said determining module is configured for defining at least one statistical parameter is further configured for defining a first statistical parameter as a mean value of the values of elements of the line, and defining a second statistical parameter as a standard deviation of the values of elements of the line.

13. The receiver according to claim 12, wherein said determining module is configured for defining a reference value further configured for calculating the reference value by using the equation:

$$T=(X_{ij}-p_1(X_{ij}))/p_2(X_{ij})$$

in which $p_1(X_{ij})$ is the first statistical parameter, $p_2(X_{ij})$ is the second statistical parameter, $X_{ij}$ is the value to be examined, and T is the calculated reference value for the value under examination, i denotes the code phase, and j denotes the frequency deviation.

14. The receiver according to claim 10, further configured for repeating the determining a frequency shift of the transmitted signal and a code phase of the code used in the modulation for each element of each line of elements of the non-coherent search matrix in the first dimension.

15. The receiver according to claim 12, wherein said determining module is adapted to perform the determination by using the equation:

$$X_{ij}>C\cdot p_2(X_{ij})+p_1(X_{ij})$$

in which $p_1(X_{ij})$ is the first statistical parameter, $p_2(X_{ij})$ is the second statistical parameter, $X_{ij}$ is the value to be examined, and C is the threshold value, denotes the code phase, and j denotes the frequency deviation.

16. The receiver according to claim 10, further configured:

for forming sample vectors from the samples; and a correlator for performing correlation between the sample vectors and said at least one reference code to form a correlation function matrix;

wherein said search matrix module for forming a non-coherent search matrix being adaptable to form said non-coherent search matrix on the basis of said correlation function matrix.

17. A module comprising:

a sampler for sampling a received code-modulated spread spectrum signal to form samples;

a reference code generator for forming at least one reference code corresponding to a code used in the modulation;

a search matrix module for forming a non-coherent search matrix on the basis of said samples, said non-coherent search matrix comprising elements in at least a first dimension, the first dimension of said non-coherent search matrix representing the same frequency deviation but different code phases of the received signal, wherein each element is addressable in the first dimension by a first index; and a determining module for determining a code phase of the code used in the modulation on the basis of values of elements of said non-coherent search matrix;

said determining module configured:

for defining at least one statistical parameter for at least one line of elements of said non-coherent search matrix in the first dimension on the basis of values of each element of said at least one line of elements;

for defining a reference value on the basis of a value of an element of said line of elements and said at least one statistical parameter;

for determining whether said element of said line of elements corresponds to the code phase of the received signal and providing an indication on such element corresponding to the code phase of the received signal; and for determining on the basis of said indication, the code phase of the received signal on the basis of the first index of said element.

18. The module according to claim 17, wherein said non-coherent search matrix also comprising elements in a second dimension representing the same code phase but different frequency deviations of the received signal, each element being addressable in the second dimension by a second index, said determining module also being adapted to determine a frequency shift of the transmitted signal, and also being adapted to examine said reference value to determine whether said element of said line of elements corresponds to the frequency deviation,
wherein the frequency deviation of the received signal is arranged to be determined on the basis of the second index of such element corresponding to the frequency deviation of the received signal.

19. The module according to claim 18, wherein said determining module is configured for defining at least one statistical parameter further configured for defining a first statistical parameter as a mean value of the values of elements of the line, and defining a second statistical parameter as a standard deviation of the values of elements of the line.

20. The module according to claim 19, wherein said determining module is configured for defining a reference value is further configured for calculating the reference value by using the equation:

$$T=(X_{ij}-p_1(X_{ij}))/p_2(X_{ij})$$

in which
  $p_1(X_{ij})$ is the first statistical parameter,
  $p_2(X_{ij})$ is the second statistical parameter,
  $X_{ij}$ is the value to be examined, and
  T is the calculated reference value for the value under examination,
  i denotes the code phase, and
  j denotes the frequency deviation.

21. The module according to claim 18, further configured for repeating the determining a frequency shift of the transmitted signal and a code phase of the code used in the modulation for each line of elements of the non-coherent search matrix in the first dimension.

22. The module according to claim 19, wherein said determining module is adapted to perform the determination by using the equation:

$$X_{ij}>C \cdot p_2(X_{ij})+p_1(X_{ij})$$

in which
  $p_1(X_{ij})$ is the first statistical parameter,
  $p_2(X_{ij})$ is the second statistical parameter,
  $X_{ij}$ is the value to be examined, and
  C is the threshold value,
  i denotes the code phase, and
  j denotes the frequency deviation.

23. A system comprising a transmitter for transmitting a code-modulated spread spectrum signal; and a receiver for receiving the transmitted code-modulated spread spectrum signal, the receiver comprising:
  a sampler for sampling the received signal to form samples;
  a reference code generator for forming at least one reference code corresponding to a code used in the modulation;
  a search matrix module for forming a non-coherent search matrix on the basis of said samples, said non-coherent search matrix comprising elements in at least a first dimension, the first dimension of said non-coherent search matrix representing the same frequency deviation but different code phases of the received signal; and
  a determining module configured for determining a code phase of the code used in the modulation on the basis of values of elements of said non-coherent search matrix;
said determining module configured:
  for defining at least one statistical parameter for at least one line of elements of said non-coherent search matrix in the first dimension on the basis of values of each element of said at least one line of elements;
  for defining a reference value on the basis of a value of an element of said line of elements and said at least one statistical parameter;
  for determining whether said element of said line of elements corresponds to the code phase of the received signal and providing an indication on such element corresponding to the code phase of the received signal; and
  for determining on the basis of indication, the code phase of the received signal on the basis of the first index of said element.

24. The system according to claim 23, wherein said non-coherent search matrix also comprises elements in a second dimension representing the same code phase but different frequency deviations of the received signal, each element being addressable in the second dimension by a second index,
  said determining module also being adapted to determine a frequency shift of the transmitted signal, and
  also being adapted to examine said reference value to determine whether said element of said line of elements corresponds to the frequency deviation,
wherein the frequency deviation of the received signal is arranged to be determined on the basis of the second index of such element corresponding to the frequency deviation of the received signal.

25. The system according to claim 24, wherein said determining module is configured for defining at least one statistical parameter is further configured for defining a first statistical parameter as a mean value of the values of elements of the line, and defining a second statistical parameter as a standard deviation of the values of elements of the line.

26. The system according to claim 25, wherein said determining module for defining a reference value is further configured for calculating the reference value by using the equation:

$$T=(X_{ij}-p_1(X_{ij}))/p_2(X_{ij})$$

in which
  $p_1(X_{ij})$ is the first statistical parameter,
  $p_2(X_{ij})$ is the second statistical parameter,
  $X_{ij}$ is the value to be examined, and
  T is the calculated reference value for the value under examination,
  i denotes the code phase, and
  j denotes the frequency deviation.

27. The system according to claim 24, further configured for repeating the determining a frequency shift of the transmitted signal and a code phase of the code used in the modulation for each line of elements of the non-coherent search matrix in the first dimension.

28. The system according to claim 25, wherein said determining module is adapted to perform the determination by using the equation:

$$X_{ij}>C \cdot p_2(X_{ij})+p_1(X_{ij})$$

in which
  $p_1(X_{ij})$ is the first statistical parameter,
  $p_2(X_{ij})$ is the second statistical parameter,
  $X_{ij}$ is the value to be examined, and
  C is the threshold value,
  i denotes the code phase, and
  j denotes the frequency deviation.

29. The system according to claim 24 wherein said transmitter is a transmitter of a GPS satellite, and said receiver is a GPS receiver.

30. A computer program product for performing an acquisition to a received code-modulated spread spectrum signal when executed on a processor, the computer program product stored in a processor readable medium, the computer program product comprising machine executable instructions for:

sampling the received signal to form samples;

forming at least one reference code corresponding to a code used in the modulation;

forming a non-coherent search matrix on the basis of said correlation function matrix, said non-coherent search matrix comprising elements in at least a first dimension, the first dimension of said non-coherent search matrix representing the same frequency deviation but different code phases of the received signal, wherein each element is addressable in the first dimension by a first index; and determining a code phase of the code used in the modulation on the basis of values of elements of said non-coherent search matrix, said determining comprising machine executable instructions for:

defining at least one statistical parameter for at least one line of said non-coherent search matrix on the basis of values of each element of said line of said non-coherent search matrix;

defining a reference value on the basis of a value of an element of said line of said non-coherent search matrix and said at least one statistical parameter; and examining said reference value to determine whether said element of said line of elements corresponds to the code phase of the received signal, wherein the code phase of the received signal are determined on the basis of the first index of such element corresponding to the frequency deviation and the code phase of the received signal.

31. The computer program product according to claim 30, said non-coherent search matrix also comprising elements in a second dimension representing the same code phase but different frequency deviations of the received signal, each element being addressable in the second dimension by a second index, said determining further comprising machine executable instructions for determining a frequency shift of the transmitted signal and examining said reference value to determine whether said element of said line of elements corresponds to the frequency deviation, wherein the computer program product comprises machine executable instructions for determining the frequency deviation of the received signal on the basis of the second index of such element corresponding to the frequency deviation of the received signal.

32. The computer program product according to claim 31, comprising machine executable instructions for defining a first statistical parameter as a mean value of the values of elements of the line, and defining a second statistical parameter as a standard deviation of the values of elements of the line.

33. The computer program product according to claim 32, comprising machine executable instructions for calculating the reference value by using the equation:

$$T = (X_{ij} - p_1(X_{ij}))/p_2(X_{ij})$$

in which $p_1(X_{ij})$ is the first statistical parameter, $p_2(X_{ij})$ is the second statistical parameter, $X_{ij}$ is the value to be examined, and T is the calculated reference value for the value under examination, i denotes the code phase, and j denotes the frequency deviation.

34. A receiver comprising:

a receiving block for receiving a code-modulated spread spectrum signal;

a sampler for sampling the received signal to form samples;

means for forming at least one reference code corresponding to a code used in the modulation;

means for forming a non-coherent search matrix on the basis of said samples, said non-coherent search matrix comprising elements in at least a first dimension, the first dimension of said non-coherent search matrix representing the same frequency deviation but different code phases of the received signal, wherein each element is addressable in the first dimension by a first index; and determining means for determining a code phase of the code used in the modulation on the basis of values of elements of said non-coherent search matrix;

said determining means comprising:

means for defining at least one statistical parameter for at least one line of elements of said non-coherent search matrix in the first dimension on the basis of values of each element of said at least one line of elements;

means for defining a reference value on the basis of a value of an element of said line of elements and said at least one statistical parameter;

examining means for determining whether said element of said line of elements corresponds to the code phase of the received signal and providing an indication on such element corresponding to the code phase of the received signal; and decision means to determine, on the basis of the indication of the examining means, the code phase of the received signal on the basis of the first index of said element.

* * * * *

UNITED STATES PATENT AND TRADEMARK OFFICE
CERTIFICATE OF CORRECTION

PATENT NO. : 7,421,011 B2  
APPLICATION NO. : 10/855806  
DATED : September 2, 2008  
INVENTOR(S) : Pietila et al.

Page 1 of 1

It is certified that error appears in the above-identified patent and that said Letters Patent is hereby corrected as shown below:

At column 16, line 18, claim 15, line 12, please insert --i-- before the word "denotes".

At column 17, line 10, claim 19, line 3, please insert the word --is-- after the word "parameter".

At column 18, line 8, claim 23, line 30, please insert the word --said-- after the word "of".

Signed and Sealed this

Twenty-eighth Day of October, 2008

JON W. DUDAS  
*Director of the United States Patent and Trademark Office*